(12) United States Patent
Huang et al.

(10) Patent No.: US 9,292,300 B2
(45) Date of Patent: Mar. 22, 2016

(54) ELECTRONIC DEVICE AND SECURE BOOT METHOD

(71) Applicant: VIA TECHNOLOGIES, INC., New Taipei (TW)

(72) Inventors: Chung-Ching Huang, New Taipei (TW); Kuo-Han Chang, New Taipei (TW); Yao-Wen Tang, New Taipei (TW); Chun-Wei Chan, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 393 days.

(21) Appl. No.: 13/973,093

(22) Filed: Aug. 22, 2013

(65) Prior Publication Data

US 2014/0115314 A1  Apr. 24, 2014

(30) Foreign Application Priority Data

Oct. 19, 2012  (TW) .............................. 101138577 A

(51) Int. Cl.
*G06F 9/44* (2006.01)
*G06F 21/57* (2013.01)

(52) U.S. Cl.
CPC ............ *G06F 9/4401* (2013.01); *G06F 21/575* (2013.01)

(58) Field of Classification Search
CPC .............................. G06F 9/4401; G06F 21/575
See application file for complete search history.

(56) References Cited

U.S. PATENT DOCUMENTS

| | | | | |
|---|---|---|---|---|
| 7,765,393 | B1 * | 7/2010 | Lee | G06F 9/4401 713/2 |
| 7,917,741 | B2 * | 3/2011 | Dutton | G06F 21/575 713/1 |
| 8,429,389 | B2 * | 4/2013 | Crowder, Jr. | G06F 21/31 380/277 |
| 8,782,801 | B2 * | 7/2014 | Zhang | G06F 21/53 713/185 |
| 2004/0103299 | A1 * | 5/2004 | Zimmer | G06F 21/57 726/26 |
| 2008/0126779 | A1 | 5/2008 | Smith | |
| 2009/0013166 | A1 * | 1/2009 | Crowder, Jr. | G06F 21/31 713/2 |
| 2009/0049510 | A1 * | 2/2009 | Zhang | G06F 21/53 726/1 |
| 2009/0089497 | A1 * | 4/2009 | Bulygin | G06F 21/564 711/112 |
| 2009/0327678 | A1 * | 12/2009 | Dutton | G06F 21/575 713/2 |
| 2013/0205395 | A1 * | 8/2013 | Zimmer | G06F 21/562 726/24 |

FOREIGN PATENT DOCUMENTS

| | | |
|---|---|---|
| CN | 101038556 | 9/2007 |
| CN | 101976320 | 2/2011 |
| TW | 200625166 | 7/2006 |
| TW | 200928975 | 7/2009 |

OTHER PUBLICATIONS

English language translation of abstract of CN 101038556 (published Sep. 19, 2007).

(Continued)

*Primary Examiner* — M Elamin
(74) *Attorney, Agent, or Firm* — McClure, Qualey & Rodack, LLP

(57) ABSTRACT

An embodiment of the invention provides a secure boot method for an electronic device including an embedded controller and a processor. The method includes the steps of verifying a secure loader by the embedded controller, unlocking a peripheral hardware of the electronic device by the embedded controller, and executing the secure loader by the processor.

17 Claims, 6 Drawing Sheets

(56) References Cited

OTHER PUBLICATIONS

English language translation of abstract of CN 101976320 (published Feb. 16, 2011).

English language translation of TW 200625166 (published Jul. 16, 2006).

English language translation of TW 200928975 (published Jul. 7, 2009).

\* cited by examiner

ELECTRONIC DEVICE AND SECURE BOOT METHOD

CROSS REFERENCE TO RELATED APPLICATIONS

This Application claims priority of Taiwan Patent Application No. 101138577, filed on Oct. 19, 2012, the entirety of which is incorporated by reference herein.

BACKGROUND OF THE INVENTION

1. Field of the Invention

The invention relates to a secure boot method, and more particularly to a secure boot method implemented by an embedded controller.

2. Description of the Related Art

Along with the popularity of computers and portable devices, consumers are now accustomed to storing a variety of information in electronic devices, for which, some of the information is regarded as information which should be secure. Currently, malicious software and Trojan programs continue to exist via the Internet, wherein secure information may be compromised or even destroyed. While antivirus software exists, some malicious software and Trojan programs load during the start-up of an electronic device before antivirus software loading, thus, not allowing the antivirus software programs to work. There are many ways to achieve secure booting, such as having a Trust Platform Module (TPM) to verify software to ensure that an electronic device can be securely booted. A TPM directly encrypts and decrypts data stored in the electronic device. Thus, even if a user's password is used without authorization, the encrypted data stored in the electronic device will not be stolen or decrypted without the corresponding TPM. However, the TPM chip increases the cost of the electronic devices.

BRIEF SUMMARY OF THE INVENTION

An embodiment of the invention provides a secure boot method for an electronic device comprising an embedded controller and a processor. The method comprises the steps of verifying a secure loader by the embedded controller, unlocking a peripheral hardware of the electronic device by the embedded controller, executing the secure loader by the processor.

Another embodiment of the invention provides a secure boot method for an electronic device comprising an embedded controller and a processor. The method comprises the steps of verifying a BIOS of the electronic device by the embedded controller, executing the BIOS and verifying an operating system loader when the BIOS is verified, when the operating system loader is verified, executing the operating system loader, by the processor, to load an operating system of the electronic device.

Another embodiment of the invention provides an electronic device with a secure booting mechanism. The electronic device comprises a processor, a secure loader, a peripheral hardware and an embedded controller. The embedded controller verifies the secure loader, wherein when the secure booting mechanism is executed, the embedded controller verifies the secure loader, and when the secure loader is verified, the embedded controller unlocks the peripheral hardware and the processor executes the secure loader.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
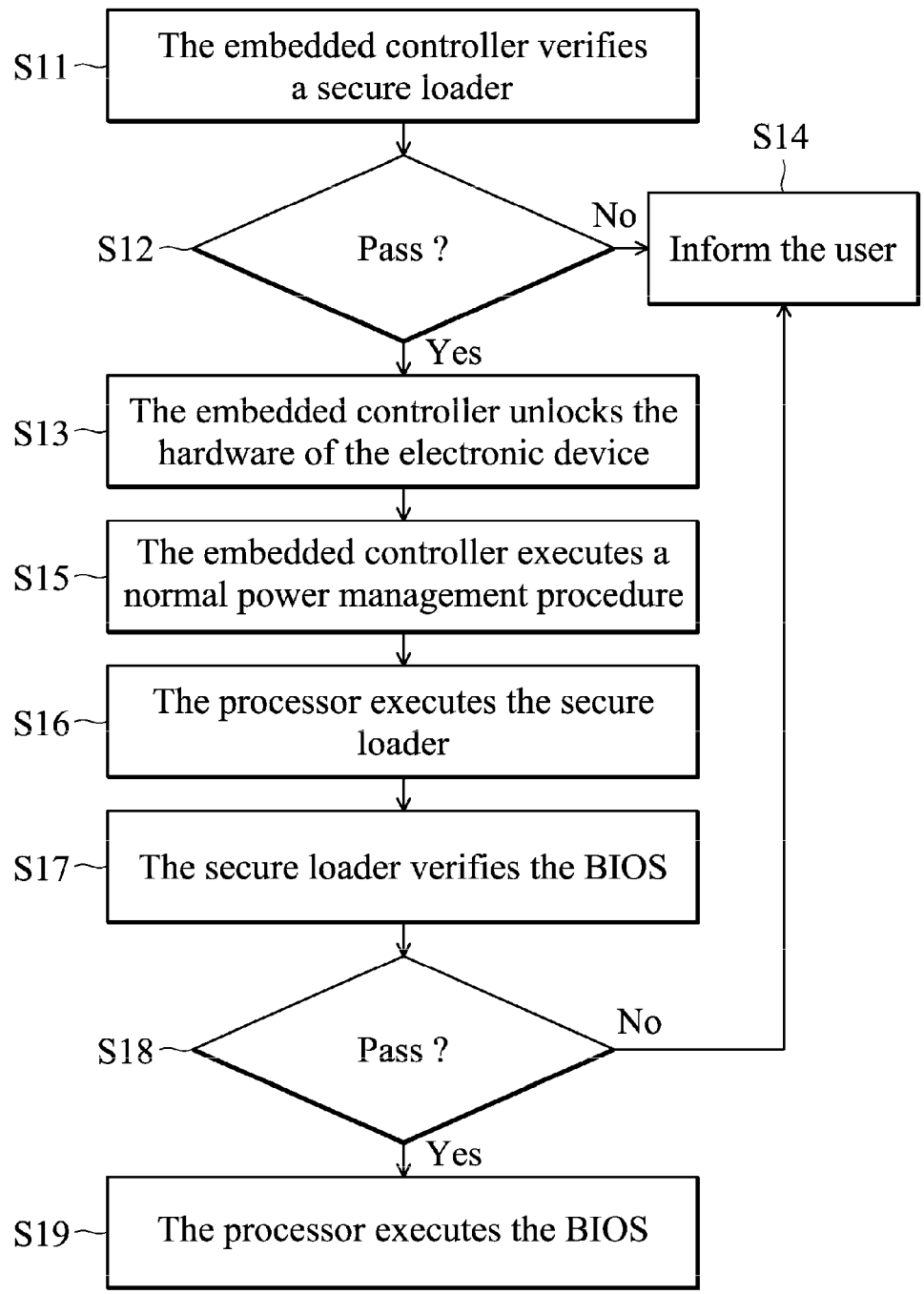
FIG. 1 is a flow chart of a secure boot method of an electronic device according to an embodiment of the invention.

FIG. 1 is a flow chart of a secure boot method of an electronic device according to an embodiment of the invention. The secure boot method can be applied to a portable device, a desktop or a laptop. The embodiment is illustrated with a laptop. The laptop comprises an embedded controller, controlling the power management, the battery management and the temperature control and fan control of the processor of the laptop. In another embodiment, the embedded controller is used to control the keyboard of the laptop.

In the invention, when the laptop is powered up by an AC adapter, the embedded controller first executes an initialization procedure and disables the power button of the laptop. Thus, a user cannot turn on the laptop via the power button for security. Similarly, when the secure boot method is applied to the portable device in the invention, the user cannot turn on the portable device via the button. In some models of portable devices, if a user wants to update the portable device or enters an engineer mode of the portable device, the user must input some specific combination of keywords to enter the engineer mode or update the portable device. By locking the power button, a user can not update the portable device or enters an engineer mode of the portable device, and then the portable device can be booted securely, which reduces unauthorized access of the operating system of the portable device.

In step S11, the embedded controller first verifies a secure loader. The embedded controller verifies the secure loader via a Hash verification procedure. In one embodiment, the secure loader and the BIOS are stored in the same storage device, such as a flash ROM. The embedded controller stores a correct Hash value of the secure loader and the address of the secure loader. When the embedded controller completes the initialization procedure, the embedded controller loads the secure loader and verifies whether the secure loader is modified or not. In one embodiment, when the embedded controller executes the initialization procedure, only the embedded controller is available. The other elements, circuits or peripheral devices of the electronic devices are locked, by the embedded controller, and cannot be accessed or operated.

In step S12, if the secure loader does not pass the verification procedure, the embedded controller or processor controls the electronic device to generate a warning message to inform a user. The warning message may be a specific acoustic signal output by a buzzer or a visible flashing light of a specific LED of the electronic device. In step S12, if the secure loader passes the verification procedure, step S13 is executed. In step S13, the embedded controller unlocks the hardware of the electronic device. At this time, the power button is unlocked and the user can turn on the electronic device via the power button.

In step S15, the embedded controller executes a normal power management procedure. In step S16, the processor executes the secure loader. In step S17, the secure loader verifies the BIOS. In step S18, if the BIOS does not pass the verification procedure, the embedded controller or the processor controls the electronic device to generate a warning message to inform a user. If the BIOS passes the verification procedure, step S19 is executed. Then, the processor executes the BIOS and loads an operating system of the electronic device.

Figure 2:
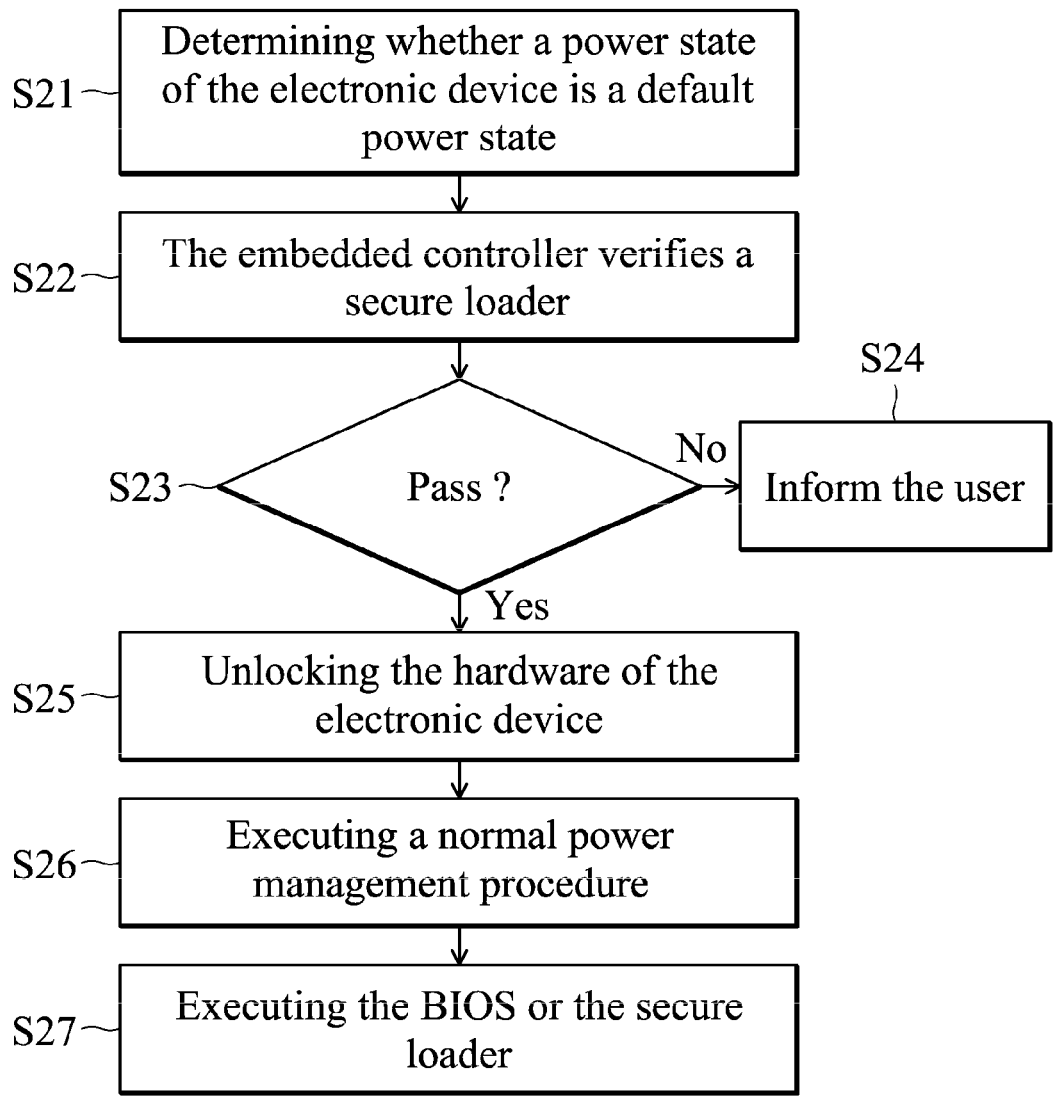
FIG. 2 is a flow chart of a secure boot method of an electronic device according to another embodiment of the invention.

FIG. 2 is a flow chart of a secure boot method of an electronic device according to another embodiment of the invention. The secure boot method can be applied to a portable device, a desktop or a laptop. The embodiment is illustrated with a laptop. The laptop comprises an embedded controller, controlling the power management of the laptop, the battery management and the temperature control and fan control of the processor of the laptop. In another embodiment, the embedded controller is the keyboard controller of the laptop.

In step S21, the embedded controller or the processor of the electronic device determines that a power state of the electronic device is a default power state. The embodiment is illustrated with the power states of the ACPI (Advanced Configuration and Power Interface) standard. In step S21, it is determined whether a power configuration of the electronic device complies with a predetermined condition. For example, whether the power state of the electronic device has changed from a specific power state to a normal operation state (S0). The specific power state may be the power state S3, S4 or S5. The following paragraph explains the meaning of each of the power states.

S3 (sleeping state, or called standby state): At this state, the main memory (such as RAM) of the electronic device is still receiving power, and may be the only powered element in the electronic device. Since the operating system, programs and opened files are all temporarily saved in the main memory (RAM), the content temporarily saved in the main memory (RAM) is not be changed when the electronic device changes its power state from the power state S3 to another power state, such as the power state S0. Thus, the user can recover the computer to previous state. At the power state S3, the private information of any executed program, such as an opened file, is not written to a nonvolatile memory, such as a hard drive.

S4 (sleeping mode): The power states S3 and S4 are sleeping modes, but the hardware configurations of the computer at the states are different. At the power state S4, most elements of the computer are not powered on. At this state, all the contents temporarily saved in the main memory (RAM) are stored in a nonvolatile memory, such as a hard drive, to protect the current state of the computer. The content of the current state comprises programs, and opened files. In other words, when the computer is resumed from the power state S4, the original working state is available for the user. This is the same result as when the computer is resumed from the power state S3 to the original working state, such as the power state S0. The difference between the power states S3 and S4 is the time it takes to move the content of the main memory (RAM) to the nonvolatile memory and remove content from the nonvolatile memory to the main memory (RAM). Furthermore, the content stored in the power state S3 is lost when a power failure happens. In the power state S4, content is not lost in during power failure because the content is stored in the hard drive.

S5 (soft off): Only the data of the operating system is reserved. The settings or functions of the power state S5 is similar to those in the power state S4. When the computer is at the power state S5, the computer may be awaken via a LAN, keyboard or USB device.

In step S21, the embedded controller or the processor of the electronic device determines whether the electronic device has entered the normal operation state S0 from the power state, such as power state S3, S4 or S5, whereafter, step S22 is then executed. In step S22, the embedded controller first verifies a secure loader. The embedded controller verifies the secure loader via a Hash verification procedure. The embedded controller stores a correct Hash value of the secure loader and the address of the secure loader. When the embedded controller completes the initialization procedure, the embedded controller loads the secure loader and verifies whether the secure loader has been modified or not.

In step S23, if the secure loader does not pass the verification procedure, the embedded controller or processor controls the electronic device to generate a warning message to inform a user. The warning message may be a specific acoustic signal output by a buzzer or a visible flashing light of a specific LED of the electronic device. In step S23, if the secure loader passes the verification procedure, step S25 is executed. In step S25, the embedded controller unlocks the hardware of the electronic device. In step S26, the embedded controller executes a normal power management procedure. In step S27, the processor of the electronic device executes the BIOS or the secure loader.

Figure 3:
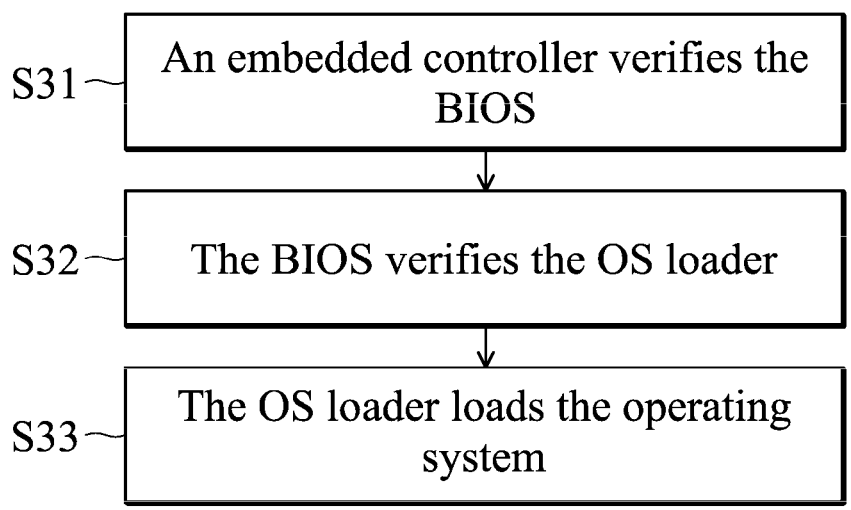
FIG. 3 is a flow chart of a secure boot method of an electronic device according to another embodiment of the invention.

FIG. 3 is a flow chart of a secure boot method of an electronic device according to another embodiment of the invention. The secure boot method can be applied to a portable device, a desktop or a laptop. The embodiment is illustrated with a laptop. The laptop comprises an embedded controller, controlling the power management of the laptop, the battery management and the temperature control and fan control of the processor of the laptop. In another embodiment, the embedded controller is the keyboard controller of the laptop.

When the laptop is turned on, if a user wants to ensure that the operating system loaded by the laptop has not been modified by hackers, first, it must be determined whether the OS loader is reliable. The OS loader is verified by the BIOS. Thus, if the BIOS is reliable, the OS loader is also reliable. In an embodiment of the invention, verifications of the BIOS is executed by an embedded controller to ensure that the laptop can be booted securely.

In step S31, an embedded controller of the laptop verifies the BIOS. The embedded controller verifies the BIOS via a Hash verification procedure. The embedded controller stores a correct Hash value of the BIOS and the address of the BIOS. When the embedded controller confirms that the BIOS has not been modified, step S32 is executed. In step S32, the processor of the laptop executes the BIOS and verifies the OS loader in the BIOS. In another embodiment, the OS loader and the BIOS are stored in the same storage device, such as a flash ROM. In another embodiment, the OS loader and the BIOS are stored in different storage devices. For example, the OS loader is stored in the hard drive and the BIOS is stored in the flash memory.

When the OS loader passes the verification procedure, step S33 is then executed. The processor executes the OS loader to load the operating system. In one embodiment, the OS loader and the operating system are stored in the same storage device, such as a hard drive or a flash memory. In another embodiment, the OS loader and the operating system are stored in different storage devices. For example, the OS loader is stored in a flash memory and the operating system is stored in the hard drive.

Thus, a safe operating system loading process is assured and the objective of secure boot is achieved.

Figure 4:
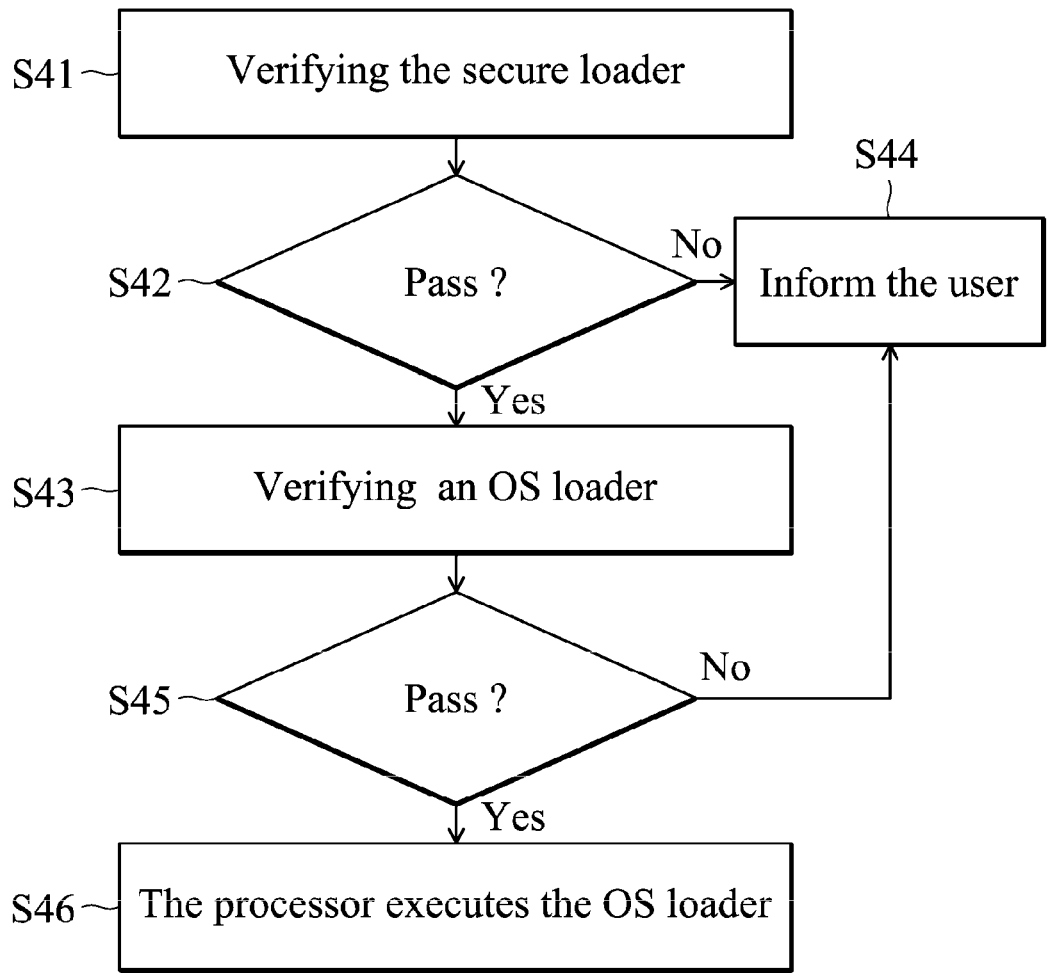
FIG. 4 is a flow chart of a secure boot method of an electronic device according to another embodiment of the invention.

FIG. 4 is a flow chart of a secure boot method of an electronic device according to another embodiment of the invention. The secure boot method is suitable for a portable device. Generally speaking, when the portable device is turned on, the operating system is loaded via an OS loader. To ensure that the portable device is booted securely, the embodiment uses a secure loader.

In step S41, the portable device is turned on and an embedded controller of the portable device is enabled. The embedded controller acquires a secure loader from a specific address in a storage device, such as a nonvolatile memory. Then, the embedded controller verifies the secure loader. In this embodiment, the embedded controller can be used to control a keyboard. In another embodiment, the embedded controller is a controller or a control circuit, except for an application processor, of the portable device.

In step S42, if the secure loader passes a verification process, step S43 is executed. If the secure loader does not pass the verification process, the embedded controller or processor controls the electronic device to generate a warning message to inform a user. In step S43, the application processor of the portable device verifies an OS loader. In step S45, if the OS loader does not pass the verification process, step S44 is executed. The embedded controller or processor controls the electronic device to generate a warning message to inform a user. If the OS loader passes the verification process, step S46 is executed. In step S46, the application processor executes the OS loader to load the operating system of the portable device.

Figure 5:
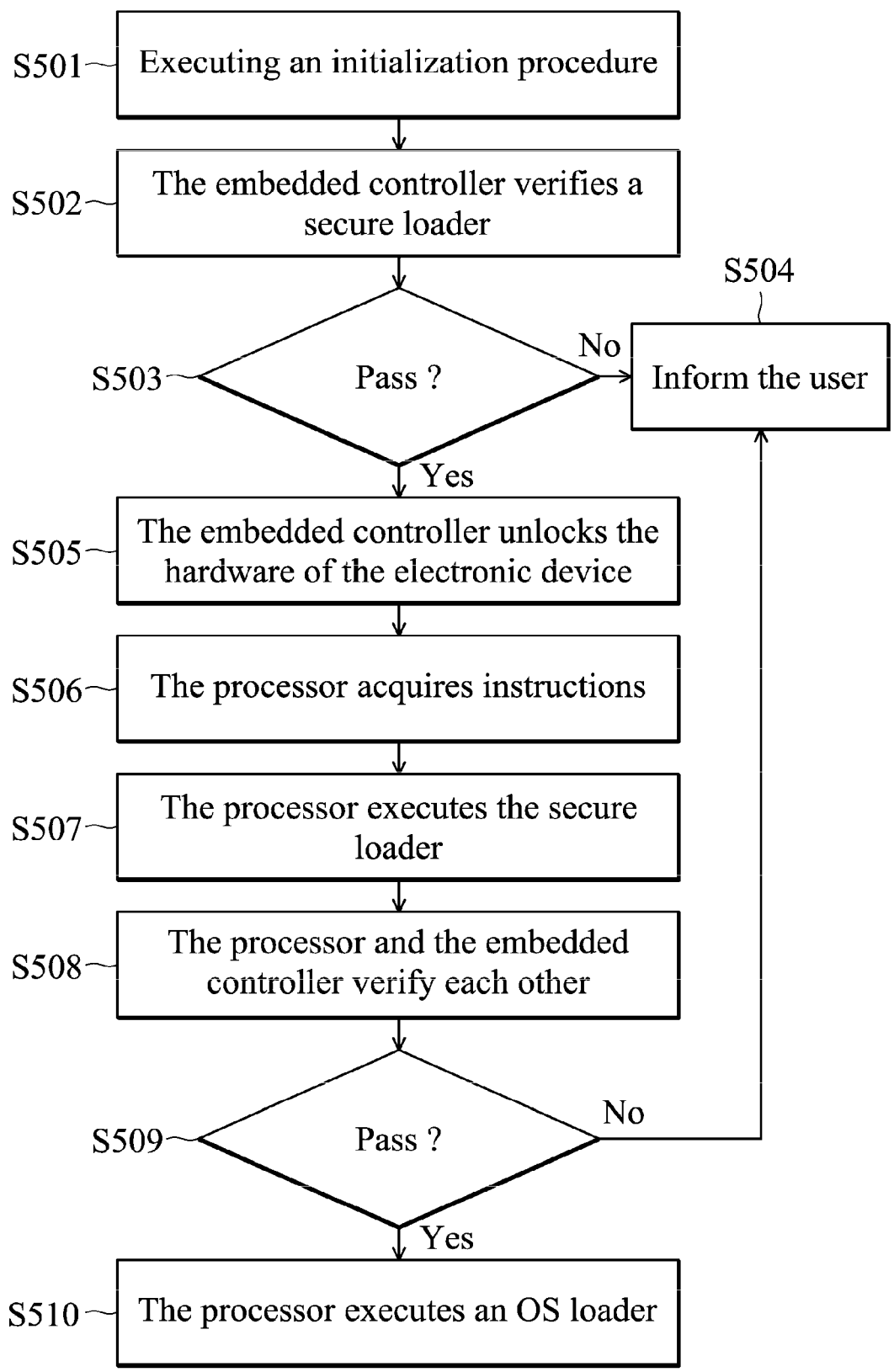
FIG. 5 is a flow chart of a secure boot method of an electronic device according to another embodiment of the invention.

FIG. 5 is a flow chart of a secure boot method of an electronic device according to another embodiment of the invention. The secure boot method can be applied to a portable device, a desktop or a laptop. The embodiment is illustrated with a laptop. The laptop comprises an embedded controller, controlling the power management of the laptop, the battery management and the temperature control and fan control of the processor of the laptop. In another embodiment, the embedded controller can be used to the keyboard controller of the laptop.

When the laptop connects to an AC adapter, a specific circuit temporally invalidates a power button of the laptop before a secure loader is verified. Accordingly, it can be assured that the firmware of the laptop has not been downgraded. Although the embodiment is illustrated with the laptop, the invention is not limited thereto. The secure boot method can also be applied to a portable device.

In step S501, the laptop connects to an AC adapter and an embedded controller is activated. The embedded controller executes an initialization procedure. The embedded controller acquires a firmware from a flash memory via a private system bus to execute the initialization procedure. During the initialization procedure, the embedded controller locks the elements or peripheral device of the laptop, except for the embedded controller and main memory, such that the elements and peripheral devices cannot be accessed or used for security.

After the embedded controller completes the initialization procedure, in step S502, the embedded controller verifies a secure loader. In one embodiment, the secure loader and the BIOS of the laptop are stored in the same storage device, such as a flash memory. The embedded controller stores a correct Hash value and a start address of the secure loader. In step S503, if the secure loader does not pass the verification process, the embedded controller or processor generates a warning message to inform a user in step S504. If the secure loader passes the verification process, step S505 is executed.

In step S505, the embedded controller unlocks the hardware of the laptop and the laptop starts its core service. The core service may be the detection of peripheral circuits. When the user presses the power button of the laptop, the embedded controller transmits a trigger signal to the processor of the laptop. In step S506, the processor acquires instructions from a specific address, such as 0xFFFF_FFF0. In step S507, the processor executes the secure loader. After the processor finishes executing the secure loader, the processor executes a power on self test (POST) of the bios.

In step S508, the processor executes the POST of the bios and laptop, and the processor executes a verification procedure with the embedded controller. The processor and the embedded controller will verify each other. In step S509, if the processor and the embedded controller pass the verification procedure in step S508, step S510 is then executed. If the processor and the embedded controller do not pass the verification procedure in step S508, step S504 is then executed. In step S510, the processor executes an OS loader of the BIOS to load an operating system. In another embodiment, the OS loader and the BIOS are stored in the same storage device, such as a flash memory. In another embodiment, the OS loader and the BIOS are stored in different storage devices. For example, the OS loader is stored in the hard drive and the BIOS is stored in the flash memory.

Notably, in this embodiment, when the operating system is loading, the embedded controller locks a storage device, such as a flash memory, storing the secure loader, the OS loader, the BIOS and corresponding Hash value to prevent the content stored in the flash memory from being maliciously modified.

Figure 6:
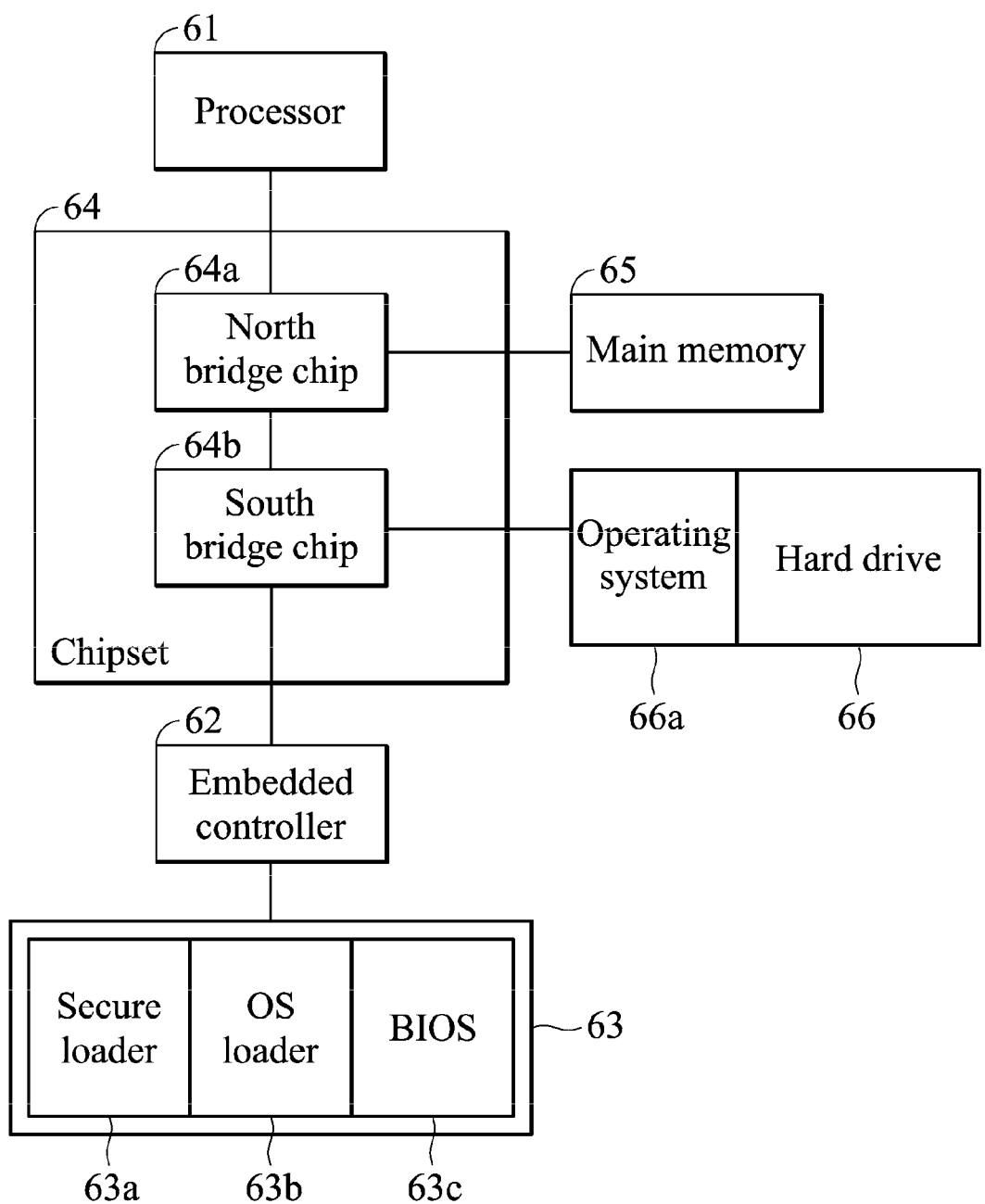
FIG. 6 is a schematic diagram of an electronic device with a secure boot mechanism according to an embodiment of the invention.

FIG. 6 is a schematic diagram of an electronic device with a secure boot mechanism according to an embodiment of the invention. The electronic device comprises a processor 61, an embedded controller 62, a flash memory 63, a chipset 64, a main memory 65 and a hard drive 66 storing an operating system 66a. The chipset 64 comprises a south bridge chip 64b and a north bridge chip 64a. A secure loader 63a, OS loader 63b and BIOS 63c are stored in the flash memory 63. When the electronic device is turned on, the embedded controller 62 and the processor 61 can execute the secure boot method described in FIGS. 1-5 to ensure that the electronic device is booted securely. Note that those skilled in the art can add or cancel steps in the secure boot methods of FIGS. 1-5.

In this embodiment, when the electronic device is turned on, a secure boot mechanism is executed. The embedded controller first executes an initialization procedure, and only the embedded controller 62 in the electronic device works normally. Meanwhile, the other elements are locked, by the embedded controller 62, and cannot work for security.

The embedded controller 62 verifies the secure loader 63a via a Hash verification procedure. The embedded controller 62 stores a correct Hash value of the secure loader 63a and the address of the secure loader 63a in the flash memory 63. If the secure loader 63a does not pass the verification procedure executed, by the embedded controller 62, the embedded controller 62 or processor 61 controls the electronic device to generate a warning message to inform a user. The warning message may be a specific acoustic signal output by a buzzer or a visible flashing LED light of a specific color of the electronic device. If the secure loader 63a passes the verification procedure, the embedded controller 62 unlocks the hardware of the electronic device. At this time, the power button is unlocked and the user can turn on the electronic device via the power button.

Then, the processor 61 executes the secure loader 63a. The secure loader 63a verifies the BIOS 63c to determine whether the BIOS 63c has been modified or not. If the BIOS 63c does not pass the verification procedure, the embedded controller 62 or processor 61 controls the electronic device to generate a warning message to inform a user. If the BIOS 63c passes the verification procedure, the processor 61 executes the BIOS 63c and the OS loader 63b to load the operating system 66a stored in the hard drive 66.

The embodiment is illustrated with the BIOS 63c, but the invention is not limited thereto. The embodiment is also suitable for an electronic device using a Unified Extensible Firmware Interface (UFEI).

The chipset 64 is a communication bridge between the processor 61 and the embedded controller 62. The north bridge chip 64a processes the communications between the processor 61 and the main memory 62. The south bridge chip 64b processes the communications between the processor 61 and peripheral devices. The peripheral device may be the hard drive 66, a keyboard, a mouse or other device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A secure boot method for an electronic device comprising an embedded controller and a processor, the method comprising:
   verifying a secure loader by the embedded controller;
   unlocking a peripheral hardware of the electronic device by the embedded controller; and
   executing the secure loader by the processor, wherein before the embedded controller verifies the secure loader, the embedded controller executes an initialization procedure to lock the peripheral hardware and disable a power button of the electronic device.

2. The method as claimed in claim 1, wherein after the processor executes the secure loader, the method further comprises:
   verifying a BIOS of the electronic device; and
   when the BIOS is verified, executing the BIOS, by the processor, to load an operating system.

3. The method as claimed in claim 2, wherein when the processor executes the BIOS, the BIOS further interactively verifies the embedded controller.

4. The method as claimed in claim 2, wherein when the processor executes the BIOS, the method further comprises:
   locking a storage device storing the BIOS and the secure loader, by the embedded controller, wherein data stored in the storage device cannot be modified.

5. The method as claimed in claim 2, further comprising:
   executing an operating system loader by the processor to load the operating system.

6. The method as claimed in claim 1, further comprising:
   when the secure loader is not verified, continually disabling the power button of the electronic device, by the embedded controller.

7. The method as claimed in claim 1, further comprising:
   determining whether a power configuration of the electronic device complies with a predetermined condition, wherein the predetermined condition is when the electronic devices returns to a normal operation mode from a sleeping mode or a standby mode; and
   when the electronic device does not comply with the predetermined condition, determining not to verify the secure loader, by the embedded controller.

8. A secure boot method for an electronic device comprising an embedded controller and a processor, the method comprising:
   verifying a BIOS of the electronic device by an embedded controller;
   executing the BIOS and verifying an operating system loader when the BIOS is verified; and
   when the operating system loader is verified, executing the operating system loader, by the processor, to load an operating system of the electronic device, wherein before the embedded controller verifies the BIOS, the embedded controller executes an initialization procedure to lock the peripheral hardware and disable a power button of the electronic device.

9. The method as claimed in claim 8, wherein when the processor executes the BIOS, the embedded controller locks a storage device storing the BIOS and the secure loader, wherein data stored in the storage device cannot be modified.

10. An electronic device with a secure booting mechanism, comprising:
    a processor;
    a secure loader;
    a peripheral hardware; and
    an embedded controller to verify the secure loader, wherein when the secure booting mechanism is executed, the embedded controller verifies the secure loader, and when the secure loader is verified, the embedded controller unlocks the peripheral hardware and the processor executes the secure loader, wherein when the embedded controller is enabled, the embedded controller executes an initialization procedure to lock the peripheral hardware and disable a power button of the electronic device.

11. The device as claimed in claim 10, wherein the processor executes the secure loader to verify a BIOS of the electronic device and when the BIOS is verified, the processor executes the BIOS to load an operating system.

12. The device as claimed in claim 11, wherein when the processor executes the BIOS, the BIOS further interactively verifies the embedded controller.

13. The device as claimed in claim 11, wherein the processor executes an operating system loader to load the operating system.

14. The device as claimed in claim 11, wherein when the processor executes the BIOS, the embedded controller locks a storage device storing the BIOS and the secure loader, wherein data stored in the storage device cannot be modified.

15. The device as claimed in claim 10, wherein when the secure loader is not verified, the power button of the electronic device is continually disabled by the embedded controller.

16. The device as claimed in claim 10, wherein the embedded controller further determines whether a power configuration of the electronic device complies with a predetermined condition, and when the power configuration of the electronic device does not comply with the predetermined condition, the embedded controller verifies the secure loader, wherein the predetermined condition is when the electronic devices returns to a normal operation mode from a sleeping mode or a standby mode.

17. The device as claimed in claim 10, wherein the embedded controller controls a keyboard or a battery of the electronic device, or monitors a temperature or a state of the processor.

* * * * *